United States Patent
Wang et al.

(10) Patent No.: US 7,281,105 B1
(45) Date of Patent: Oct. 9, 2007

(54) METHOD AND APPARATUS FOR SELECTING DATA STORAGE DEVICES FOR PARTICIPATING IN LOGICAL VOLUME EXCHANGE PROCESS BASED ON AGGREGATED WORKLOAD STATISTICS

(75) Inventors: Hui Wang, Upton, MA (US); Ron Arnan, Brookline, MA (US); Tao Kai Lam, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 347 days.

(21) Appl. No.: 11/087,111

(22) Filed: Mar. 23, 2005

(51) Int. Cl.
*G06F 12/00* (2006.01)
(52) U.S. Cl. ........................ 711/165; 711/112
(58) Field of Classification Search ............... None
See application file for complete search history.

(56) References Cited

U.S. PATENT DOCUMENTS

| | | | |
|---|---|---|---|
| 6,189,071 B1 | 2/2001 | Bachmat | |
| 6,341,333 B1 | 1/2002 | Schreiber et al. | |
| 6,405,282 B1 | 6/2002 | Lam et al. | |
| 6,415,372 B1 | 7/2002 | Zakai et al. | |
| 6,442,650 B1 | 8/2002 | Bachmat et al. | |
| 6,480,930 B1 | 11/2002 | Zakai et al. | |
| 6,557,074 B1 | 4/2003 | Michel et al. | |
| 6,584,545 B2 | 6/2003 | Bachmat et al. | |
| 6,601,133 B2 | 7/2003 | Zakai et al. | |
| 6,611,896 B1 | 8/2003 | Mason, Jr. et al. | 711/114 |
| 6,614,616 B1 | 9/2003 | Michel et al. | 360/78.04 |
| 6,622,221 B1 | 9/2003 | Zahavi | 711/154 |
| 6,664,964 B1 | 12/2003 | Levin-Michael et al. | |
| 6,665,771 B1 | 12/2003 | Michel et al. | |
| 6,671,774 B1 | 12/2003 | Lam et al. | |
| 6,675,274 B1 | 1/2004 | Lam et al. | |
| 6,694,405 B2 | 2/2004 | Lam et al. | |
| 6,711,649 B1 | 3/2004 | Bachmat et al. | |
| 6,715,039 B1 | 3/2004 | Michel et al. | 711/133 |
| 6,721,870 B1 | 4/2004 | Yochai et al. | 711/204 |
| 6,728,840 B1 | 4/2004 | Shatil et al. | 711/137 |
| 6,804,733 B1 | 10/2004 | Michel et al. | |

*Primary Examiner*—Reginald Bragdon
*Assistant Examiner*—Ngoc Dinh
(74) *Attorney, Agent, or Firm*—BainwoodHuang

(57) ABSTRACT

In a selective logical-volume swapping process, a subset of storage devices in a storage system are selected that represent good candidates for swaps that will improve system performance. Workload statistics are utilized from a number of sample intervals in a relatively long analysis interval. The workload statistics are aggregated over intermediate intervals of each analysis interval to yield a set of aggregated statistics much smaller than the set of workload statistics. Based on the aggregated statistics, a service processor searches for swaps of logical volumes, ranks the swaps according to expected system performance improvement, and selects source and target storage devices of the higher-ranked swaps. The service processor can then perform a full optimization analysis for this subset of storage devices utilizing the workload statistics from all the sample intervals. More efficient use of processing resources is achieved through the use of the smaller set of aggregated statistics to identify the subset of devices for which full analysis is performed.

28 Claims, 5 Drawing Sheets

METHOD AND APPARATUS FOR SELECTING DATA STORAGE DEVICES FOR PARTICIPATING IN LOGICAL VOLUME EXCHANGE PROCESS BASED ON AGGREGATED WORKLOAD STATISTICS

BACKGROUND

The performance of data storage systems typically depends in part on the arrangement or configuration of the stored data. For example, data items that are heavily utilized are often distributed among multiple storage devices in the system to avoid "bottlenecks", i.e., devices that have long service times for data accesses because of the quantity of requests they receive. System performance is generally improved when different file systems and databases that receive heavy concurrent use are stored on different storage devices within the system.

There are known techniques for improving storage system performance by selectively moving stored data within a system in a manner calculated to reduce the service times provided by devices within the system. In one such technique, statistical data is collected regarding the accesses to logical volumes stored on storage devices within a storage system. This statistical data is aggregated over many sample intervals to obtain a measure of average or total service time for each storage device within the system over an analysis interval that may span several days or longer. A pair of candidate storage devices and one or more pairs of potentially exchangeable logical volumes are then identified, and further processing is performed to determine whether the service times of the storage devices can be improved by exchanging the logical volumes of one or more of the pairs between the two drives, i.e., by moving each volume of the pair from its present storage device to the other storage device. In particular, it is determined whether the service time of a more heavily loaded storage device will be reduced, and the service time of a less heavily loaded storage device will not be increased unduly, if the exchange of logical volumes is performed. If so, the logical volumes are marked as a potential swap that can be performed in a subsequent swap operation. The above analysis is repeated for some number of the logical volumes of the storage system (which may be as many as all of them) to identify potential swaps that can be performed, and one or more of these swaps are carried out in subsequent swap operations. This process is repeated at periodic measurement intervals to enable the system to continuously adjust to changing workloads and other factors affecting the pattern of disk activity.

A technique which is similar to that described above is provided in U.S. Pat. No. 6,711,649 to Bachmat et al. entitled "Load Balancing on Disk Array Storage Device," the teachings of which are hereby incorporated by reference in their entirety.

SUMMARY

Although the performance of storage systems can be improved by using a logical volume swapping process as described above, both the time required to access the workload statistics and the processing required for the analysis can become quite large as the number of storage devices and logical volumes in the storage system increase. In particular, these processing burdens increase roughly as the square of the number of logical volumes to be analyzed. If the number of logical volumes is sufficiently high, it may not be possible to complete the exhaustive searching of the technique described above within a reasonable budget of processing resources, such as computation time on a standard single-processor computer. In such a case, the process may not be able to adequately optimize the configuration of the logical volumes on the storage devices.

In accordance with embodiments of the present invention, a technique is disclosed for performing a more selective logical-volume swapping process, referred to as an optimization process, in a storage system. Generally the technique involves selecting a subset of the storage devices that represent good candidates for finding swaps that will improve system performance. Then a full optimization process is executed for only the subset of the devices, rather than for all devices in the storage system. As a result, the processing burden associated with the optimization process is substantially less than that for prior optimization approaches. However, the candidate storage devices are selected in such a way that the best swaps still tend to be identified over time, so that the performance of the storage system is improved in a manner commensurate with the performance improvement achieved when the more exhaustive process described above is utilized.

A processor such as a service processor within the storage system aggregates the workload statistics over intermediate intervals of each analysis interval to generate aggregated workload statistics regarding the data transactions directed to the logical volumes over each of the intermediate intervals. The intermediate intervals may be measured in terms of a number of successive sample intervals, which could be as few as one and as many as twenty or more. Based on the aggregated statistics, the processor searches for swaps of logical volumes among the storage devices and ranks the swaps according to respective amounts of expected performance improvement for the storage system. Each swap involves a relatively busy source storage device and a relatively idle target storage device. The processor then forms the subset of storage devices by selecting source and target storage devices on which the logical volumes of the higher-ranked swaps.

The processor can then perform a full optimization analysis for the subset of storage devices utilizing the workload statistics from all the sample intervals. By using the aggregated workload statistics of all devices to identify the swaps and then performing the full optimization analysis on only the corresponding subset of storage devices, the overall optimization process is more efficient in terms of processing resources than prior optimization processes, and therefore is more suitable for use with larger storage systems.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
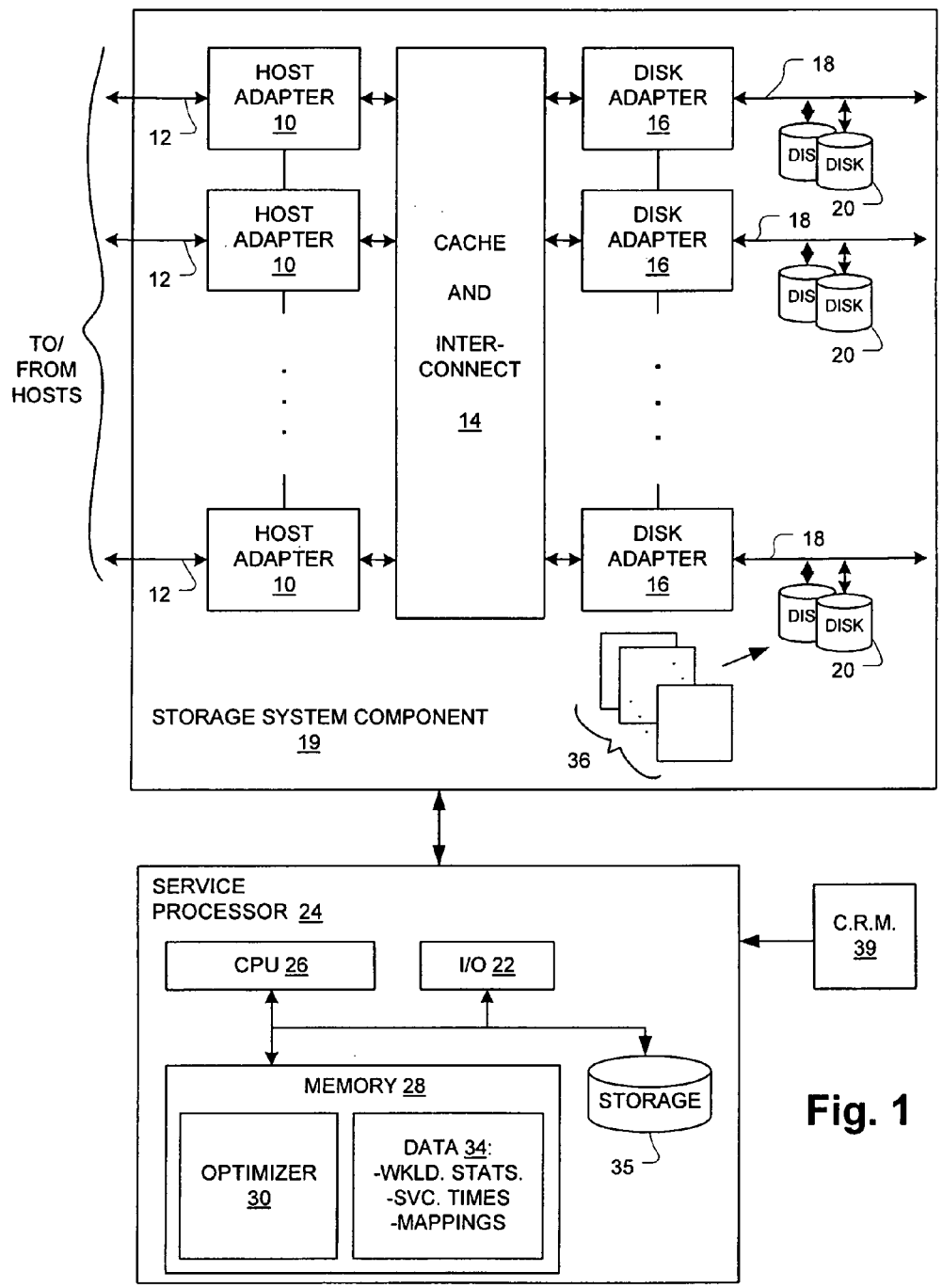
FIG. 1 is a block diagram of a data storage system including a service processor having an optimization program for performing selective volume swapping in accordance with the present invention.

FIG. 1 shows a data storage system for storing data for a number of host computers (or simply hosts). The host computers are coupled to respective host adapters 10 via respective interconnect buses 12, such as Fiber Channel or other high-speed storage interconnect buses. The host adapters 10 are coupled to cache and interconnect block 14, which in turn is coupled to disk adapters 16. Each disk adapter 16 interfaces to one or more storage buses 18 to which a plurality of storage devices 20 (e.g., disk drives) are connected. The storage buses 18 may be Small Computer System Interconnect (SCSI) buses for example.

In the illustrated embodiment, the above-described components are part of a storage system component 19 that may include a distinct physical housing. An example of such a storage system component is a Symmetrix® storage system sold by EMC Corporation.

The storage system component 19 has an interface to an input/output portion 22 of a service processor 24, which may be for example a personal computer, notebook computer or similar device. The service processor 24 includes a central processor (CPU) 26, a memory 28, and local attached storage 35, which is typically a disk drive. During operation, the memory 28 stores an optimization program (optimizer) 30 that has been loaded from the attached storage 35 and is executed as an optimization process by the CPU 26. The memory 28 also stores various data 34, including workload statistics and service times that are calculated as part of the optimization process, and a mapping of logical volumes to the physical storage devices 20. The nature and use of these data are described below. The interface between the storage system component 19 and the service processor 24 permits the service processor 24 to communicate with the host adapters 10 and the disk adapters 16 for a variety of purposes, including gathering the workload statistics and swapping logical volumes among the storage devices 20 as described below. The input/output portion 22 also enables the service processor 24 to obtain the optimizer program 30 from a computer-readable medium (CRM) 39 such as a compact disc or other non-volatile storage medium.

During operation of the storage system component 19, the host adapters 10 respond to storage requests from the hosts by determining whether the requests can be satisfied from a large cache memory within the cache and interconnect block 14. In the case of host read requests for data found in the cache memory (referred to as "read hits"), the data is read from the cache memory and returned to the requesting host. In the case of host write requests, the data is written into the cache memory and is also provided to an appropriate disk adapter 16 to be stored on one or more of the storage devices 20 as determined by a storage address associated with the data. In the case of host read requests for data not found in the cache memory (referred to as "read misses"), an appropriate disk adapter 16 retrieves the data from one of the storage devices 20 (as determined by the storage address), stores the data in the cache memory, and supplies the data to the host adapter 10 from which the request originated. The requesting host adapter 10 returns the data to the requesting host. The adapters 16 also implement prefetching in order to populate the cache with data that might be the subject of subsequent read requests.

The above operations generally proceed without any involvement of the service processor 24. The service processor 24 is an ancillary device for use in configuring and managing the various resources within the storage system, especially the storage devices 20 and the data stored thereon. In particular, the optimizer program 30 of the service processor 24 is used to analyze operation of the storage system to determine whether it is possible to reconfigure the pattern of data storage on the storage devices 20 to improve system performance by reducing the time required to access data, referred to as "service time". The operation of the optimizer program 30 within the data storage system is described in detail below.

Generally, modern storage systems employ data organization constructs referred to as "logical volumes", which are units of storage that are visible to the hosts via the host adapters 10. A set of logical volumes is shown at 36 in FIG. 1. Among other attributes, a logical volume 36 has a size as represented by a range of addresses. A host to which a logical volume 36 is allocated performs input/output (I/O) operations to the logical volume 36 as though it were a distinct physical storage device. The data associated with logical volumes 36 is stored in corresponding areas of the physical storage devices 20, and the storage system maintains a map or translation structure that associates each logical volume 36 with areas on one or more storage devices 20 where data for the logical volume 36 is stored. Examples of these mappings are shown below.

In some cases, a logical volume 36 has a one-to-one mapping to an area of a single storage device 20. When data protection in the form of parity or replication is provided, a given logical volume 36 may be associated with a set of storage areas of multiple storage devices 20. At any given moment, there is a mapping of all logical volumes 36 to corresponding storage devices 20 where the logical volume data are stored. Viewed another way, this mapping also describes, for each storage device 20, the set of logical volumes 36 that are currently stored on it. The logical-to-physical mapping is generally useful for carrying out host read and write requests based on logical volume identifiers accompanying the requests. The reverse (physical-to-logical) mapping assists the optimizer 30 in associating volume-based workload statistics with individual storage devices 20, as described in more detail below. As mentioned above, a data structure representing these mappings is contained within the data 34 of the service processor 24. A simplified example of these two mappings is given in the Tables 1 and 2 below:

TABLE 1

Logical-to-Physical Mapping

| Logical Volume | Disk Device |
|---|---|
| 1 | 1, 3, 5, 7 |
| 2 | 2, 4, 6, 8 |
| 3 | 1 |

TABLE 1-continued

Logical-to-Physical Mapping

| Logical Volume | Disk Device |
|---|---|
| 4 | 3, 8 |
| 5 | 2, 7 |
| ... | ... |
| Li | {Dj} |

TABLE 2

Physical-to-Logical Mapping

| Disk Device | Logical Volumes |
|---|---|
| 1 | 1, 3, ... |
| 2 | 2, 5, ... |
| 3 | 1, 4, ... |
| ... | ... |
| Dj | {Li} |

In the above example, logical volumes 1, 2, 4 and 5 appear on multiple disk drives 20 due to a parity or replication configuration as referred to above.

Figure 2:
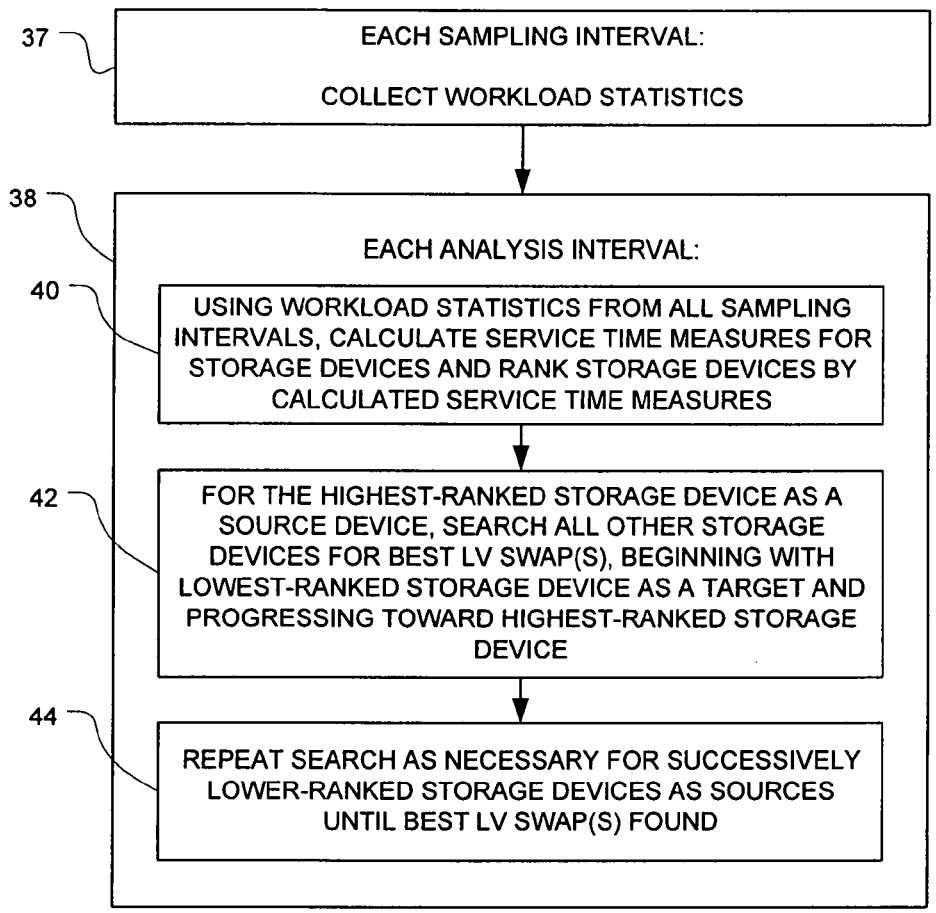
FIG. 2 is a flow diagram of an optimization process for performing an exhaustive search for logical volume swaps in the data storage system of FIG. 1.

FIG. 2 shows an optimization process that is part of the optimizer program 30 of FIG. 1. Two distinct operational phases are shown. In a first phase, step 37 is performed once for each of a number of sample intervals. In one embodiment, the sample intervals are on the order of 10 minutes long. Shorter or longer sample intervals are possible in alternative embodiments. Shorter intervals are generally preferred for improved accuracy of the optimizer 30, while longer intervals tend to reduce the processing burden created by the optimizer 30. In a second operational phase, a set of steps 38 is performed at much longer "analysis intervals", for example one week. Again, other intervals are possible.

In step 37, the service processor 24 collects statistics regarding the workload of the storage devices 20 on a per-logical-volume basis. Due to the presence of the cache memory in the cache and interconnect block 14, the workload experienced by the storage devices 20 is generally different from the workload presented by the hosts. Host read requests that hit in the cache, for example, do not result in requests to the storage devices 20. On the other hand, the cache generates pre-fetches of data from the storage devices 20 that may never be used to satisfy a host read request. Thus, the specific workload of the storage devices 20 that is monitored includes the following transactions:

Host Read Misses
Host Writes
Prefetches

For each logical volume 36 that is involved in one of the above transactions during a sample interval, the disk adapters 16 track (1) the number of such transactions, and (2) the amount of data transferred for each transaction type. For all other logical volumes, a transaction count of zero is recorded. The service processor 24 collects this information from the disk adapters 16 and stores it in a database on the attached storage 35. This statistics-collection process is repeated during each sample interval.

In step 40 of FIG. 2, the service processor 24 retrieves the workload statistics from the attached storage 35 and uses the workload statistics to calculate per-sample-interval service times and per-analysis-interval service time measures for the storage devices 20 based on the mapping of logical volumes 36 to physical storage devices 20. The computation of service times employs a model that reflects three primary components of delay or service time in reading or writing data to/from a storage device: seek time, rotational delay, and data transfer time. The average rotational delay experienced for each transaction is estimated at ⅓ of the disk revolution period. The data transfer time is a function of the size of the data transfer, the bit density and revolution rate of the disk. These factors are applied to each transaction to arrive at a transfer time for the transaction. The transfer time is added to the rotational delay for each transaction. Then, for each storage device 20, the summed values for all transactions involving any of the logical volumes on that device are added together. The result represents the total rotational delay and transfer time for the storage device 20 over the sample interval.

The service processor 24 calculates seek time using a model that incorporates a set of predetermined seek time constants for each pair of logical volumes 36 on each storage device 20. Each seek time constant represents the time required for a seek when an access to one logical volume of the pair is followed by an access to the other logical volume of the pair. The set of seek time constants can be obtained from the manufacturer of the storage device 20, or they can be obtained empirically. The seek time constants are combined with a set of weighted transaction counts for each volume, where the weighting reflects differences among the transaction types from a device loading perspective. For example, prefetches and writes are usually more sequential in nature than read-misses, and therefore result in fewer seeks. Thus, read-misses are weighted more heavily than writes and prefetches. In one weighting scheme, the weighted transaction count for a logical volume over a sample interval is calculated as the sum of (read misses)+½(writes)+¼(prefetches).

The service processor 24 then calculates the total seek time for a given storage device 20 over a sample interval (in accordance with one model) as follows:

$$T(\text{seek})=(\text{SUM}(T_{ij}*A_i*A_j))/(\text{SUM}(A_k))$$

where the SUM in the numerator is over all pairs of logical volumes i and j, $T_{ij}$ is the predetermined seek time constant for the pair of logical volumes i and j, and $A_i$ and $A_j$ are the weighted transaction counts for the same pair of logical volumes. The SUM in the denominator is the sum of all weighted transaction counts for all the logical volumes 36 on the storage device 20.

For each storage device 20, the value T(seek) is added to the values obtained for total rotational delay and data transfer time to arrive at the service time for the storage device 20 for the sample interval.

After calculating the per-sample-interval service times as above, the service processor 24 calculates respective service time measures for the storage devices 20. The service time measure for each storage device 20 is calculated by adding together the service times for the storage device over all the sample intervals. Once the service time measures for all the storage devices 20 have been calculated, the service processor 24 ranks the storage devices 20 according to the calculated service time measures. An example of such a ranking is shown in the bar chart of FIG. 3, where the x-axis numbers are arbitrary storage device identifiers and the y-axis height of each bar represents the magnitude of the calculated service time measure for the corresponding device.

Returning to FIG. 2, in step 42 the service processor 24 searches for one or more best swaps of logical volumes (LV) 36 involving the highest-ranked storage device 20 (i.e., a swap of a logical volumes on the storage device 20 having the greatest service time measure with a logical volume on some other storage device 20). The best swaps are those that reduce the service time measure of the higher-ranked, relatively busy, storage device (referred to as the "source" for a swap) without unduly increasing the service time measure of the lower-ranked, relatively idle, storage device (referred to as the "target" for a swap). The number of swaps to be identified can be a fixed or user-specified parameter of the search, and may be one or some number greater than one. It may be desirable to perform only a small number of swaps in a given analysis interval to minimize the operational disruption that occurs when a swap of logical volumes is actually carried out. Although only a small number of swaps may be performed, it is generally necessary to search for all possible swaps and then rank the swaps in order to identify the one or more best swap(s) to perform. The approach shown in FIG. 2 can be used to perform a focused search, by evaluating swaps involving the highest-ranked storage device as a source device first and then proceeding to lower-ranked storage devices as source devices only as may be required to find the desired number of swaps.

As shown in step 42, the search for best swaps for the highest-ranked device 20 as a source device begins with the lowest-ranked storage device 20 (the storage device having the lowest service time measure) as a target device, and progresses toward the highest-ranked storage device 20. The goal is to find swaps that reduce the service time measure of the source storage device 20 without unduly increasing the service time measure of the target storage device 20, such that overall system performance is improved. During this process, the service processor 24 selects specific logical volumes 36 for potential swapping between the source storage device 20 and the target storage device 20. In one approach, the logical volumes 36 on each storage device 20 are ranked according to their weighted transaction counts as determined above. The logical volumes 36 of the source device 20 are considered in order from highest-ranked to lowest-ranked, while the logical volumes of the target storage device 20 are considered in order from lowest-ranked to highest-ranked.

An example is given to illustrate the operation of step 42. Let it be assumed that logical volumes are distributed among the ranked storage devices as follows:

| (Highest) Device 1 | ... | Device (M-1) | (Lowest) Device M |
|---|---|---|---|
| LV1 | | LV4 | LV7 |
| LV2 | | LV5 | LV8 |
| LV3 | | LV6 | LV9 |

In step 42, potential swaps of logical volumes would be analyzed in the following pair-wise fashion:
1. (LV1, LV7)
2. (LV1, LV8)
3. (LV1, LV9)
4. (LV2, LV7)
5. (LV2, LV8)
6. (LV2, LV9)
7. (LV3, LV7)
8. (LV3, LV8)
9. (LV3, LV9)
10. (LV1, LV4)
11. (LV1, LV5)
12. (LV1, LV6)
13. (LV2, LV4)
14. (LV2, LV5)
15. (LV2, LV6)
16. (LV3, LV4)
17. (LV3, LV5)
18. (LV3, LV6)

At the completion of step 42, some number of best swaps involving the highest-ranked storage device 20 as a source have been identified. In some cases, this number may be zero or some non-zero number that is less than a desired minimum number of swaps to be identified. In such a case, the searching for swaps continues for successively lower-ranked storage devices 20 as sources as shown at step 44 until either the desired number of swaps have been found or all possible swaps have been considered.

As described above, the optimization process of FIG. 2 can be executed as a "full" optimization process that performs exhaustive searching for best swaps utilizing all the workload statistics for all the storage devices 20. As previously mentioned, as the number of storage devices 20 in the storage system component 19 grows, so does the requirement for processing resources to carry out such exhaustive best-swap searching. These processing resources include input/output bandwidth of the attached storage device 35 to retrieve the workload statistics, as well as CPU time for performing the analysis based on the statistics. For a given quota of such processing resources, the process of FIG. 2 may not be able to successfully find the desired number of best swap(s). Such a situation is very undesirable.

Figure 4:
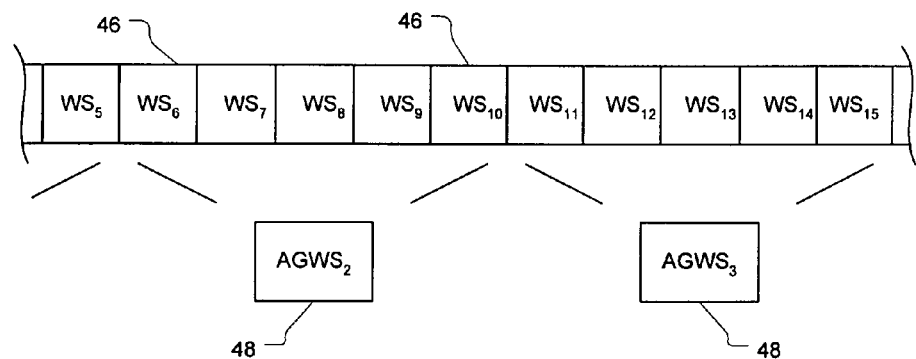
FIG. 4 is a diagram depicting the aggregation of workload statistics over intermediate intervals in a selective logical-volume swapping process in the storage system of FIG. 1.

FIG. 4 illustrates a process by which the service processor 24 reduces the amount of statistical data it must access and utilize when performing an optimization analysis like that of FIG. 2, thus improving processing efficiency so that the optimization process can be used in larger storage systems. As the per-sample-interval workload statistics ($WS_i$) 46 are collected (e.g. step 37 in FIG. 2), they are aggregated over intermediate intervals into aggregated workload statistics ($AGWS_j$) 48. In the illustrated example, each set of aggregated workload statistics 48 is produced from the per-sample-interval workload statistics 46 collected over five successive sample intervals. More generally, the entire collection of aggregated workload statistics 48 is substantially K times smaller than the collection of per-sample-interval workload statistics 46, where K represents the number of sample intervals that constitute the intermediate interval over which the workload statistics 46 are aggregated. In the illustrated example, K is equal to five. In general, K can vary from one to twenty or more.

Each individual set of aggregated workload statistics 48 represents the K sample intervals from which it is formed. More specifically, in the illustrated embodiment each set of aggregated workload statistics 48 includes the total number of Host Read Misses, Host Writes and Prefetches, as well as the total number of data blocks transferred for each of those three transaction types, over the respective set of K sample intervals.

Figure 5:
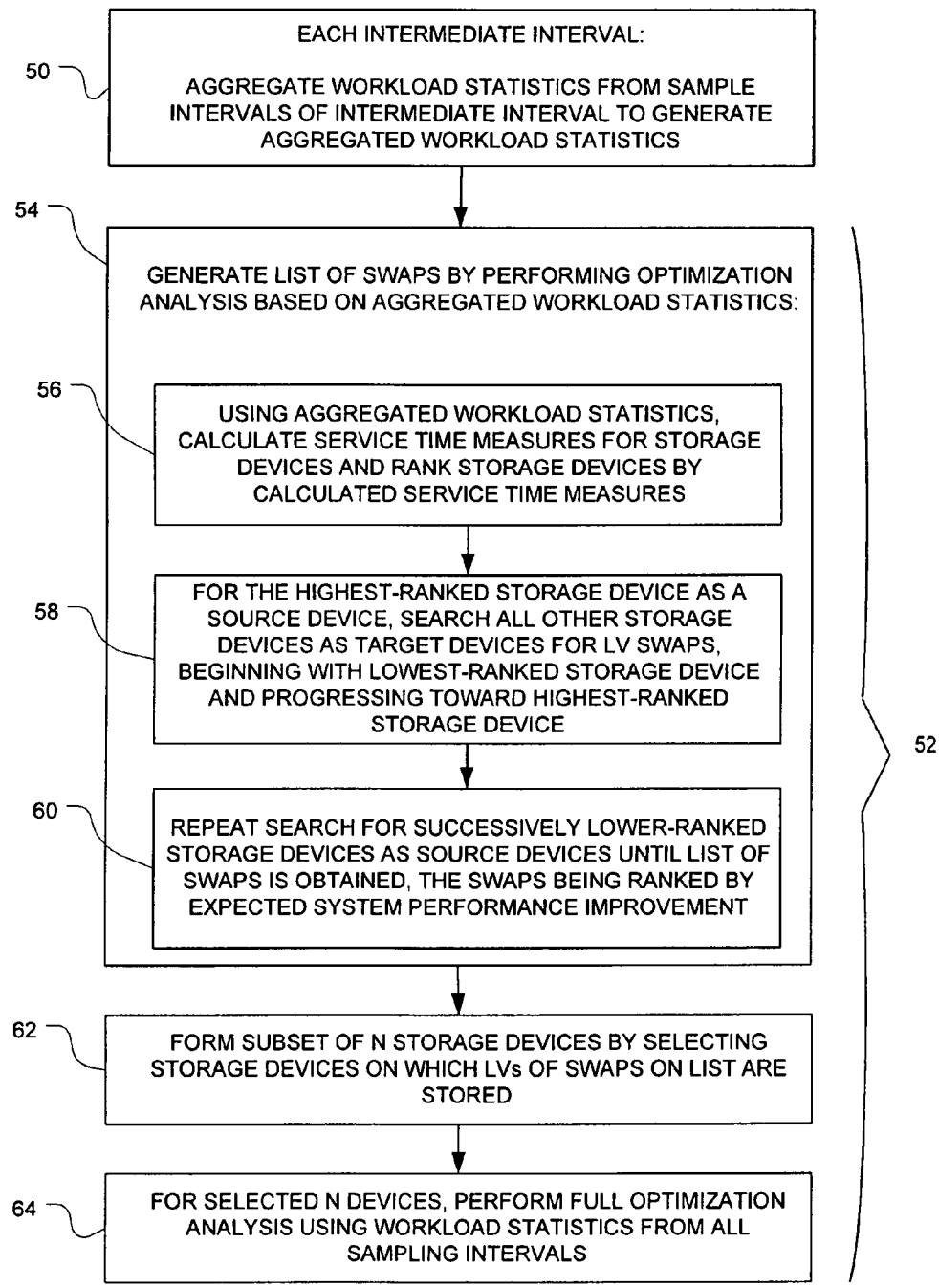
FIG. 5 is a flow chart of a selective logical-volume swapping process in the storage system of FIG. 1.

FIG. 5 shows a process by which the service processor 24 generates the aggregated workload statistics 48 of FIG. 4 and selects a subset of the storage devices 20 for optimization analysis based on the aggregated workload statistics 48. In step 50 of FIG. 5, for each intermediate interval of K successive sample intervals, the service processor 24 aggregates the per-sample-interval workload statistics 46 to create a corresponding set of aggregated workload statistics 48.

This aggregation is preferably performed as the per-sample-interval workload statistics 46 are being collected (see step 37 of FIG. 2) and thus still residing in the memory 28 of the service processor, before being stored in the attached storage 35.

The remaining steps of the process of FIG. 5, which are collectively referred to by reference number 52, are performed once per analysis interval, which in general spans a large number of intermediate intervals. In the case of 10-minute sample intervals, K=6, and a 7-day analysis interval, for example, there are 168 intermediate intervals per analysis interval.

In step 54, the service processor 24 generates a list of swaps by performing an optimization analysis like that of FIG. 2 but based on only the aggregated workload statistics 48. It will be appreciated that this analysis is inherently less sensitive to the correlation of activities of logical devices than the process of FIG. 2, for example, because the aggregated workload statistics 48 do not reflect the activity of the storage system component 19 with the same precision as do the per-sample-interval workload statistics 46. However, the purpose of this list of swaps is not to identify swaps that will actually be carried out, but rather to identify storage devices 20 that are likely to contribute good candidate swaps during a second stage of analysis as described below. The reduction in accuracy for this purpose is acceptable, especially in view of the large gains in processing efficiency.

Step 54 includes step 56 in which the service processor 24 uses the aggregated workload statistics 48 to calculate service time measures for the storage devices 20, and then ranks the storage devices by the calculated service time measures. This process is similar to step 40 of FIG. 2 except that it uses only the aggregated workload statistics 48 rather than the per-sample-interval workload statistics 46. Accordingly, step 56 is generally executed much more quickly than step 40 of FIG. 2, because it accesses and processes a data set that is K times smaller. The result of the execution of step 56 is a ranking of the storage devices 20 similar to that shown in FIG. 3.

Steps 58 and 60 are similar to corresponding steps 42 and 44 of FIG. 2. It is necessary to identify a number of swaps that involve a desired number of storage devices 20, because as described below, the underlying objective is to identify a good subset of the storage devices 20 on which the full optimization process can be executed. As an example, if for a given storage system it is desired to identify 50 storage devices on which to run the full optimization process, then at least 25 swaps must be identified in steps 58 and 60 if possible.

As further indicated at step 60, the swaps are ranked by respective amounts of system performance improvement that would be expected, as determined by calculating the changes in the service time measures of the storage devices if each swap were actually carried out.

At step 62, the ranked swaps are used to identify a subset of N of the storage devices 20 for which the full optimization process is to be run. It is generally desired to pick approximately N/2 relatively busy devices as potential sources and a generally equal number of relatively idle devices as potential targets. Thus, both the source and target storage devices 20 of the higher-ranked swaps are selected. Various selection methods can be used. For example, exactly N/2 source devices and N/2 target devices can be selected beginning with the devices for the highest-ranked swap and progressing to lower-ranked swaps. As an alternative, N/2 source devices from the highest-ranked swaps could be chosen as well as all the corresponding target devices from such swaps. As a further alternative, it may be desirable to select the storage devices of swaps that satisfy some performance improvement criteria, for example a minimum improvement of service time measures as described above with respect to step 60.

In step 64, the N storage devices 20 that are identified by the method of FIG. 5 are subjected to the full optimization analysis process of FIG. 2. This analysis is based on the workload statistics 46 from all sample intervals. Thus, this analysis accurately identifies the best swaps to be performed among the selected storage devices 20 in order to improve system performance. Additionally, greater computational efficiency is achieved through the use of the aggregated workload statistics 48 to identify a good subset of storage devices 20 for the analysis.

While in the process of FIG. 5 the service processor 24 searches for swaps for the highest-ranked storage device 20 and progresses to lower-ranked storage devices 20 as potential sources, in alternative embodiments the searching may be accomplished in different ways. The goal is to identify some number of the best swaps that could be performed, such that the storage devices 20 that are selected on the basis of the ranked swaps are likely to provide good swaps for improving system performance when the full optimization analysis is performed.

Figure 6:
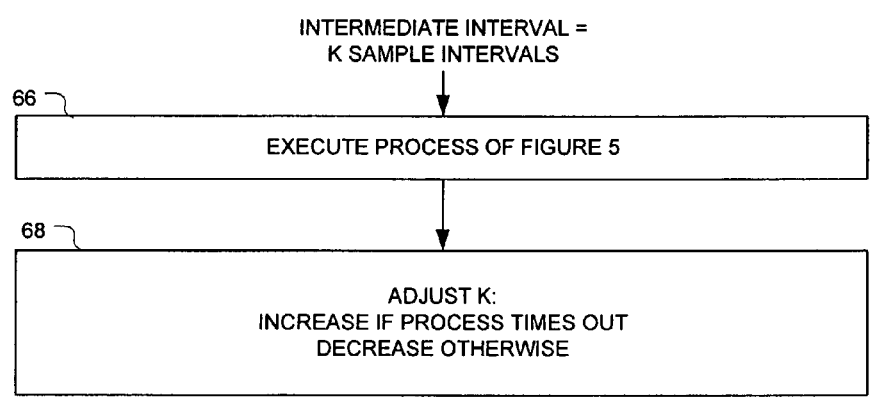
FIG. 6 is a flow chart of a process for adjusting a parameter of the process of FIG. 5.

FIG. 6 shows a process by which the value of K, which represents the number of sample intervals per intermediate interval, can be adjusted to achieve a desired balance between accuracy and computational efficiency. Step 66 represents one iteration of the process of FIG. 5. In step 68, K is adjusted based on whether or not the process of FIG. 5 "timed out", i.e., was not finished executing when an allocated quota of processing time within the service processor 24 elapsed. If the process did time out, then K is increased. This has the effect of increasing the size of the intermediate interval and therefore reducing the amount of data that will be utilized in the next iteration of the process of FIG. 5. If the process did not time out, however, then the value of K is decreased, which has the effect of improving accuracy by reducing the amount of aggregation of the workload statistics 46.

The process of FIG. 5 can be seen as a standalone use of the process for selecting storage devices for optimization analysis based on an aggregation of the workload statistics 46 rather than the full set of workload statistics 46. It is also possible to utilize the results of this process in conjunction with other algorithms for identifying good candidate devices 20 for the optimization analysis, and such a use is now described with reference to FIG. 7.

Figure 7:
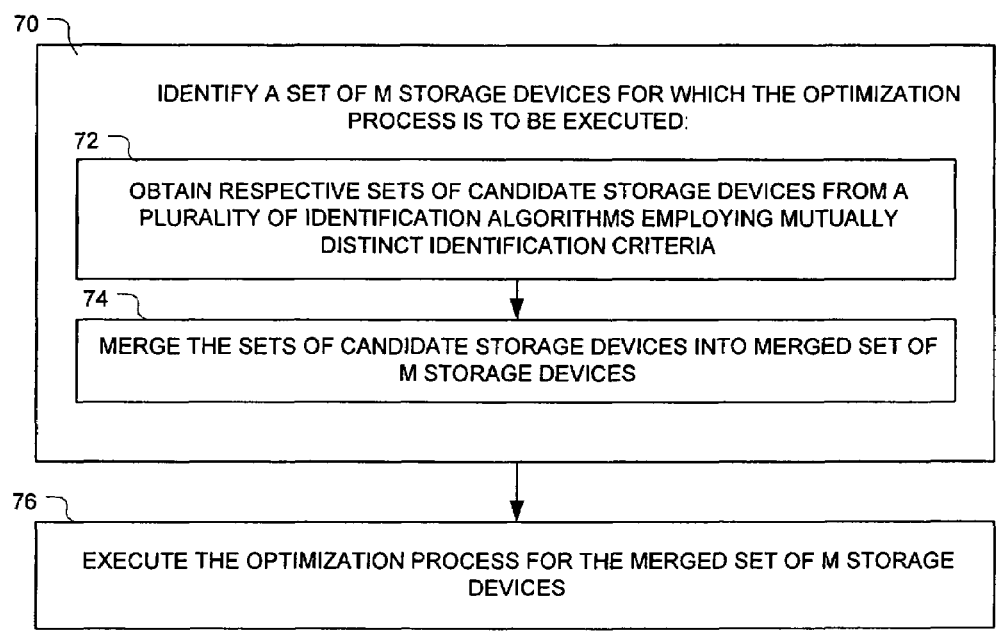
FIG. 7 is a flow diagram of an optimization process in the storage system of FIG. 1 utilizing the process of FIG. 5.

As shown in FIG. 7, in a first step 70, a set of M storage devices 20 is identified for which the full optimization analysis process is to be executed. In general, M can be any value up to the entire number of storage devices 20 within the storage system component 19. M may be fixed or adjustable (either manually or automatically) as necessary to keep the execution time of the overall process within some desired limit, such as one hour for example. If M is automatically adjusted, then a convenient initial value for M (for example upon re-configuring the storage system component 19 or some other initial operating state) is the total number of storage devices 20 within the storage system component 19. Thus, if there are 1000 storage devices 20 within the storage system component 19, then the initial value for M could be M=1000. During subsequent operation, M would automatically be adjusted downward as necessary to achieve the one-hour limit on execution time, in a manner similar to the above-described adjustment of K.

In step 72, the service processor 24 identifies respective sets of candidate storage devices 20 using multiple identification algorithms that employ different identification criteria. One such algorithm can be the algorithm described above with reference to FIGS. 4-6, the result of which is a selection of some number N of the storage devices 20. Because different identification algorithms (including the above algorithm) have built-in biases that may affect the overall accuracy of the optimization process, it is desirable to obtain additional sets of good candidate storage devices 20 from other identification algorithms.

Figure 3:
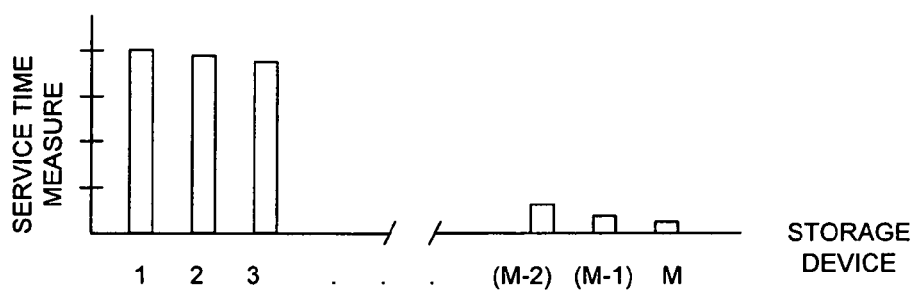
FIG. 3 is a bar chart depicting service times for a plurality of storage devices in the data storage system of FIG. 1.

According to a second such identification algorithm, then, the service processor 24 may simply select a predetermined number of the highest-ranked and lowest-ranked storage devices 20 according to the service time ranking of FIG. 3. This identification algorithm has the benefit of simplicity, given that the ranking of FIG. 3 is already required for execution of the optimization analysis process.

In a third identification algorithm, the service processor 24 selects some number of storage devices 20 at random. The presence of a random element in the identification process may be desirable to avoid any systematic inaccuracies due to the nature of the identification criteria used by the other identification algorithms.

After the service processor 24 has identified sets of candidate storage devices 20 by the various identification algorithms in step 72, it merges these sets into a merged set of M storage devices in step 74. Merging may be accomplished in a variety of ways, and may to some extent be dependent on the identification results. As an example, let it be assumed that M=80 storage devices 20 are to be selected from among 200 storage devices 20 within the storage system component 19, and that the above three identification algorithms are utilized. If each set of candidate storage devices 20 from the various identification algorithms has at least one-third of eighty (i.e., 27) storage devices 20, then 27 are taken from each set. If one or more of the sets has fewer than 27 storage devices 20, then more can be taken from another set or sets. If, because of overlaps between the sets of candidates, the resulting selection is smaller than 80, then additional candidates can be chosen from one or more of the sets. In alternative embodiments, it may be desirable to take different proportions from the different sets, such as 60% from one, 30% from a second, and 10% from a third. The proportions may be fixed or varied over time. Because of the desirability of some degree of randomness, it is preferable that some number of randomly selected storage devices 20 be included in the final set of M storage devices 20.

Once the merged set of M storage devices 20 has been identified, then in step 76 the service processor 24 performs the full optimization analysis process (such as described above with reference to FIG. 2) on this identified set of M devices.

It is to be understood that the invention may be embodied in a processing device such as the service processor 24, generally including a memory loaded with program component(s) such as the optimizer program 30 that, when loaded into the memory and executed by a processor, cause the processor to implement the functionality described and claimed herein. Such processor-implemented methods are in some cases referred to herein by the term "process" used in the general sense of "method" as opposed to its stricter sense in the context of a computer operating system, for example. It also may be embodied in a computer-readable medium on which such program component(s) are stored in a non-volatile manner, for loading into the processor memory and execution. Additionally, in alternative embodiments part or all of the functionality may be performed from within a storage system component such as storage system component 19 or on a host computer for example.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of identifying a subset of a plurality of storage devices of a storage system to participate in a logical volume exchange process for improving performance of the storage system, the method utilizing workload statistics from a plurality of sample intervals in a relatively long analysis interval regarding data transactions directed to logical volumes stored on the storage devices, the method comprising:
   (A) aggregating the workload statistics over intermediate intervals of each analysis interval to generate aggregated workload statistics regarding the data transactions directed to the logical volumes over each of the intermediate intervals;
   (B) based on the aggregated statistics, identifying swaps of logical volumes among the storage devices and ranking the swaps according to respective amounts of expected performance improvement for the storage system, each swap involving a relatively busy source storage device and a relatively idle target storage device; and
   (C) forming the subset of the plurality of storage devices by selecting source and target storage devices of higher-ranked ones of the identified swaps.

2. A method according to claim 1, wherein the intermediate interval is defined as an integer number K of consecutive sample intervals.

3. A method according to claim 2, wherein K is in range of 5 to 20.

4. A method according to claim 2, wherein K is a dynamically adjustable variable.

5. A method according to claim 4, further comprising:
   after a first iteration of steps (A) through (C), increasing K if a predetermined quota of processing time has elapsed before a desired number of swaps has been identified, and otherwise decreasing K.

6. A method according to claim 1, further comprising collecting the workload statistics during the sample intervals, and wherein the workload statistics are aggregated as they are collected.

7. A method according to claim 1, wherein the selecting of storage devices comprises:
   forming separate lists of source and target storage devices, the storage devices in each list being ranked according to respective amounts of expected performance improvement for the storage system for the swaps involving the storage devices; and
   selecting source and target storage devices from among the highest-ranked devices of each list.

8. A method according to claim 7, wherein the selecting of source and target storage devices comprises selecting an integer number N/2 from each list.

9. A method according to claim 7, wherein the selecting of source and target storage devices comprises selecting storage devices from the list of source storage devices and those target devices from the list of target devices that are involved in the same higher-ranked swaps as the selected source storage devices.

10. A method according to claim 1, wherein the selecting of storage devices comprises selecting the storage devices involved with swaps whose performance improvement satisfies a predetermined performance improvement criterion.

11. A method according to claim 1, wherein the identifying of swaps comprises:
calculating service time measures from the aggregated workload statistics for each of the storage devices for each of the intermediate intervals and ranking the storage devices by the service time measures;
beginning with a highest-ranked storage device as a source device, searching a lower-ranked storage devices as target devices for the swaps, the searching beginning with the lowest-ranked storage device as a target device and progressing toward the highest-ranked storage device as a target device; and
repeating the preceding searching step for successively lower-ranked storage devices as source devices until the swaps have been identified.

12. A method of identifying logical volumes to be exchanged among a plurality of storage devices of a storage system to improve performance of the storage system, comprising:
performing the storage device identifying method of claim 1 to identify a subset of storage devices of the storage system; and
performing a full optimization analysis process on the identified subset of storage devices, the full optimization analysis process including (1) calculating service times for each of the subset of storage devices for each of the sample intervals and ranking the subset of storage devices by the service times, (2) for a highest-ranked storage device of the subset as a source device, searching a lower-ranked storage devices of the subset as target devices for one or more best swaps of logical volumes between the source storage device and the target storage device, the searching beginning with the lowest-ranked storage device as the target device and progressing toward the highest-ranked storage device, and (3) repeating the preceding searching step (2) for successively lower-ranked storage devices as source devices until a desired number of swaps are found.

13. A method of identifying logical volumes to be exchanged among a plurality of storage devices of a storage system to improve performance of the storage system, comprising:
performing a plurality of storage device identifying methods to identify a corresponding plurality of subsets of storage devices of the storage system, the storage device identifying methods including the storage device identifying method of claim 1;
merging the plurality of subsets of storage devices of the storage system into a merged subset; and
performing a full optimization analysis process on the merged subset of storage devices, the full optimization analysis process including (1) calculating service times for each of the subset of storage devices for each of the sample intervals and ranking the subset of storage devices by the service times, (2) for a highest-ranked storage device of the subset as a source device, searching a lower-ranked storage devices of the subset as target devices for one or more best swaps of logical volumes between the source storage device and the target storage device, the searching beginning with the lowest-ranked storage device as the target device and progressing toward the highest-ranked storage device, and (3) repeating the preceding searching step (2) for successively lower-ranked storage devices as source devices until a desired number of swaps are found.

14. A processing device comprising a processor, memory and an input/output interface, the input/output interface being coupleable to a set of device controllers of a storage system having storage devices on which logical volumes are stored, the memory being operative to store an optimizer program executable by the processor, the processor being operative when executing the optimizer program to perform an optimization process for identifying a subset of a plurality of storage devices of a storage system to participate in a logical volume exchange process for improving performance of the storage system, the optimization process utilizing workload statistics from a plurality of sample intervals in a relatively long analysis interval regarding data transactions directed to logical volumes stored on the storage devices, the optimization process comprising:
(A) aggregating the workload statistics over intermediate intervals of each analysis interval to generate aggregated workload statistics regarding the data transactions directed to the logical volumes over each of the intermediate intervals;
(B) based on the aggregated statistics, identifying swaps of logical volumes among the storage devices and ranking the swaps according to respective amounts of expected performance improvement for the storage system, each swap involving a relatively busy source storage device and a relatively idle target storage device; and
(C) forming the subset of the plurality of storage devices by selecting source and target storage devices of higher-ranked ones of the identified swaps.

15. A processing device according to claim 14, wherein the intermediate interval is defined as an integer number K of consecutive sample intervals.

16. A processing device according to claim 15, wherein K is in range of 5 to 20.

17. A processing device according to claim 15, wherein K is a dynamically adjustable variable.

18. A processing device according to claim 17, wherein the optimization process further comprises:
after a first iteration of steps (A) through (C), increasing K if a predetermined quota of processing time has elapsed before a desired number of swaps has been identified, and otherwise decreasing K.

19. A processing device according to claim 14, wherein the optimization process further comprises collecting the workload statistics during the sample intervals, and wherein the workload statistics are aggregated as they are collected.

20. A processing device according to claim 14, wherein the selecting of storage devices comprises:
forming separate lists of source and target storage devices, the storage devices in each list being ranked according to respective amounts of expected performance improvement for the storage system for the swaps involving the storage devices; and
selecting source and target storage devices from among highest-ranked devices of each list.

21. A processing device according to claim 20, wherein the selecting of source and target storage devices comprises selecting an integer number N/2 from each list.

22. A processing device according to claim 20, wherein the selecting of source and target storage devices comprises selecting storage devices from the list of source storage devices and those target devices from the list of target devices that are involved in the same higher-ranked swaps as the selected source storage devices.

23. A processing device according to claim 14, wherein the selecting of storage devices comprises selecting the storage devices involved with swaps whose performance improvement satisfies a predetermined performance improvement criterion.

24. A processing device according to claim 14, wherein the identifying of swaps comprises:
   calculating service time measures from the aggregated workload statistics for each of the storage devices for each of the intermediate intervals and ranking the storage devices by the service time measures;
   beginning with a highest-ranked storage device as a source device, searching a lower-ranked storage devices as target devices for the swaps, the searching beginning with the lowest-ranked storage device as a target device and progressing toward the highest-ranked storage device; and
   repeating the preceding searching step for successively lower-ranked storage devices as source devices until the swaps have been identified.

25. A processing device according to claim 14, wherein the optimization process further comprises:
   performing a full optimization analysis process on the selected plurality of storage devices, the full optimization analysis process including (1) calculating service times for each of the subset of storage devices for each of the sample intervals and ranking the subset of storage devices by the service times, (2) for a highest-ranked storage device of the subset as a source device, searching a lower-ranked storage devices of the subset as target devices for one or more best swaps of logical volumes between the source storage device and the target storage device, the searching beginning with the lowest-ranked storage device as a target storage device and progressing toward the highest-ranked storage device, and (3) repeating the preceding searching step (2) for successively lower-ranked storage devices as source devices until a desired number of swaps are found.

26. A processing device according to claim 14, wherein the steps (A)-(C) form at least part of a first storage device identifying method, and wherein the optimization process further comprises:
   performing a plurality of storage device identifying processes to identify a corresponding plurality of subsets of storage devices of the storage system, the storage device identifying processes including the first storage device identifying method;
   merging the plurality of subsets of storage devices of the storage system into a merged subset; and
   performing a full optimization analysis process on the merged subset of storage devices, the full optimization analysis process including (1) calculating service times for each of the merged subset of storage devices for each of the sample intervals and ranking the subset of storage devices by the service times, (2) for a highest-ranked storage device of the subset as a source device, searching a lower-ranked storage devices of the subset as target devices for one or more best swaps of logical volumes between the source storage device and the target storage device, the searching beginning with the lowest-ranked storage device as a target storage device and progressing toward the highest-ranked storage device, and (3) repeating the preceding searching step (2) for successively lower-ranked storage devices as source devices until a desired number of swaps are found.

27. A storage system, comprising:
   a plurality of storage devices on which logical volumes are stored;
   a set of device controllers operative, based on workload statistics from a plurality of sample intervals in a relatively long analysis interval regarding data transactions directed to logical volumes stored on the storage devices, to:
   (A) aggregate the workload statistics over intermediate intervals of each analysis interval to generate aggregated workload statistics regarding the data transactions directed to the logical volumes over each of the intermediate intervals;
   (B) based on the aggregated statistics, identify swaps of logical volumes among the storage devices and ranking the swaps according to respective amounts of expected performance improvement for the storage system, each swap involving a relatively busy source storage device and a relatively idle target storage device; and
   (C) form the subset of the plurality of storage devices by selecting source and target storage devices of higher-ranked ones of the identified swaps.

28. A computer program storage medium on which an optimizer program is stored, the optimizer program being operative when executed by a processor in a storage system to perform an optimization process for identifying a subset of a plurality of storage devices of a storage system to participate in a logical volume exchange process for improving performance of the storage system, the optimization process utilizing workload statistics from a plurality of sample intervals in a relatively long analysis interval regarding data transactions directed to logical volumes stored on the storage devices, the optimization process comprising:
   (A) aggregating the workload statistics over intermediate intervals of each analysis interval to generate aggregated workload statistics regarding the data transactions directed to the logical volumes over each of the intermediate intervals;
   (B) based on the aggregated statistics, identifying swaps of logical volumes among the storage devices and ranking the swaps according to respective amounts of expected performance improvement for the storage system, each swap involving a relatively busy source storage device and a relatively idle target storage device; and
   (C) forming the subset of the plurality of storage devices by selecting source and target storage devices of higher-ranked ones of the identified swaps.

* * * * *